May 3, 1949. K. CONRAD ET AL 2,469,104
ELECTRIC MOTOR
Filed April 25, 1947 2 Sheets-Sheet 1

Keith Conrad and
James W. Hackett
Inventors.
By Dybvig & Dybvig
Their Attorneys.

Patented May 3, 1949

2,469,104

UNITED STATES PATENT OFFICE 2,469,104

ELECTRIC MOTOR

Keith Conrad and James W. Hackett,
Toledo, Ohio

Application April 25, 1947, Serial No. 743,908

14 Claims. (Cl. 172—36)

This invention relates to an electric motor and more particularly to a motor of the type used in hand tools and the like.

One object of this invention is to provide a motor having a remote distributed field having improved characteristics and ease of compensation.

Another object of this invention is to provide a small diameter motor design which permits the field structure to act both as the case and also the handle for the device.

More particularly, it is an object of this invention to provide an improved motor in which the field windings are arranged in axial alignment with the armature of the motor.

Another object of this invention is to provide an improved arrangement for preventing overheating of the motor.

A further object of this invention is to provide a motor design which permits greater ease and speed of assembly and disassembly for manufacturing, service and/or inspection purposes.

Further objects and advantages of the present invention will be apparent from the following description reference being had to the accompanying drawings wherein a preferred form of the present invention is clearly shown.

Figure 1:
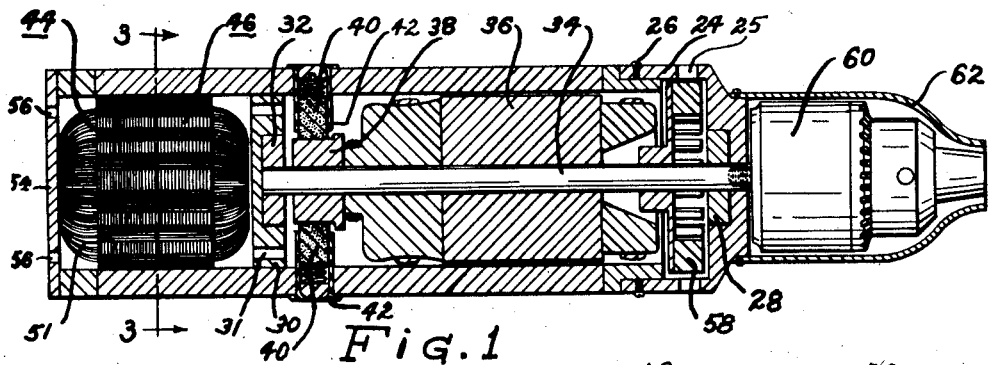
Figure 1 is a sectional view showing somewhat diagrammatically a preferred form of motor embodying my invention.
Figure 2:
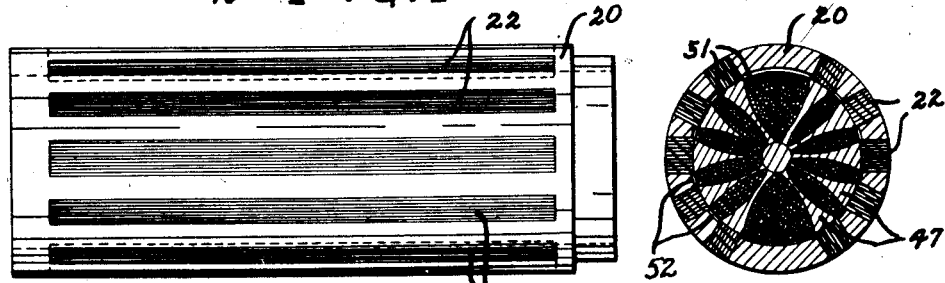
Figure 2 is an elevational view of the main motor casing.

Referring now to the arrangement shown in Figures 1 through 6 of the drawings, reference numeral 20 designates generally a cylindrical casing made of aluminum or any other non-magnetic material and having incorporated therein ferro-magnetic laminated field pole sections 22. The one end of the casing 20 is closed by means of an end bell 24 which is removably secured to the casing or housing 20 by means of screws 26. The end bell 24 includes a shaft bearing insert 28. Intermediate the ends of the casing 20, there is provided a wall portion or bearing support 30 which includes a shaft bearing insert 32.

The armature shaft 34 is journaled in the bearing inserts 28 and 30 as shown. Reference numeral 36 designates a conventional armature which is secured to the shaft 34 and numeral 38 designates a conventional commutator which cooperates with conventional brushes 40 supported by the casing 20 intermediate the armature 36 and the field winding. The construction and arrangement of the brushes and the brush holding elements 42 may be varied without departing from the spirit of my invention.

Figure 3:
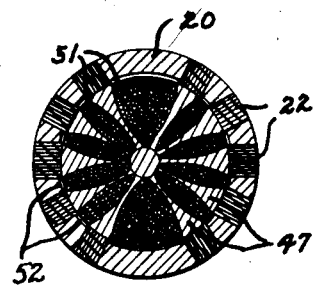
Figure 3 is a sectional view taken on line 3—3 of Figure 1.
Figure 4:
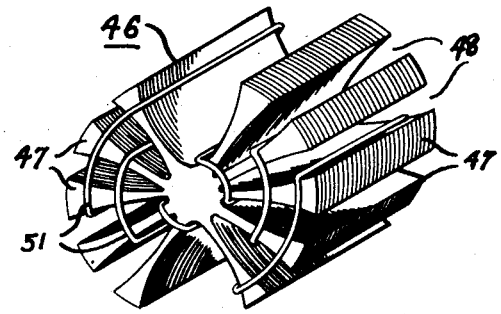
Figure 4 is a pictorial view showing the main field laminations and diagrammatically showing the arrangements of the field windings.
Figure 5:
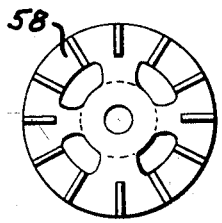
Figure 5 is an end elevational view of the air circulating fan.
Figure 6:
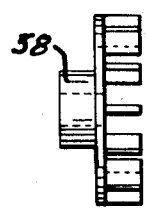
Figure 6 is a side elevational view of the air circulating fan.

Contrary to usual practice, the motor stator which has been generally designated by the reference numeral 44 is arranged in axial alignment with the armature 36. The stator 44 comprises a laminated core 46 constructed as best shown in Figure 4 of the drawing. The core is provided with pole pieces 47 separated by slots 48 for receiving the motor windings 50. As best shown in Figures 3 and 4, the pole pieces 47 are arranged in two oppositely extending groups of poles arranged in alignment with similarly arranged laminated field pole inserts 22 which form a part of the casing or housing 20. The field coils 51 are arranged as diagrammatically shown in Figure 4 of the drawing and the field coils for each group of 5 pole pieces are connected in series but the windings for the one group are arranged in opposite direction to the windings of the other group.

Again referring to Figure 3, it will be noted that the non-magnetic portion of the casing 20 is thinner than the magnetic portion with the result that air passages 52 are formed adjacent the outer surface of each field coil.

The one end of the casing 20 is closed by means of a plate 54 which is provided with air intake openings 56. A centrifugal fan 58 is secured to the shaft 34 as shown and serves to pull air in through the openings 56, through the air passages 52, through the air passages 31 provided in the wall 30 and then through the air gap formed between the armature 36 and the casing 20. The fan then discharges the air out through the air outlets 25 formed in the end bell 24. The air intake openings 56 are arranged at the end farthest removed from the chuck so as to be exposed to the cleanest air available and the brushes are arranged at the end of the armature farthest away from the chuck whereby there is less possibility of dust, etc. contaminating the commutator. Furthermore, the air discharging through the air outlets 25 serves to blow away any dust particles or the like produced while using the device.

For purposes of illustration, we have shown a chuck 60 which may be used with drills, buffers, sanders, and other types of tools. A shield 62 is provided for enclosing the chuck 60 as shown.

Figure 7:
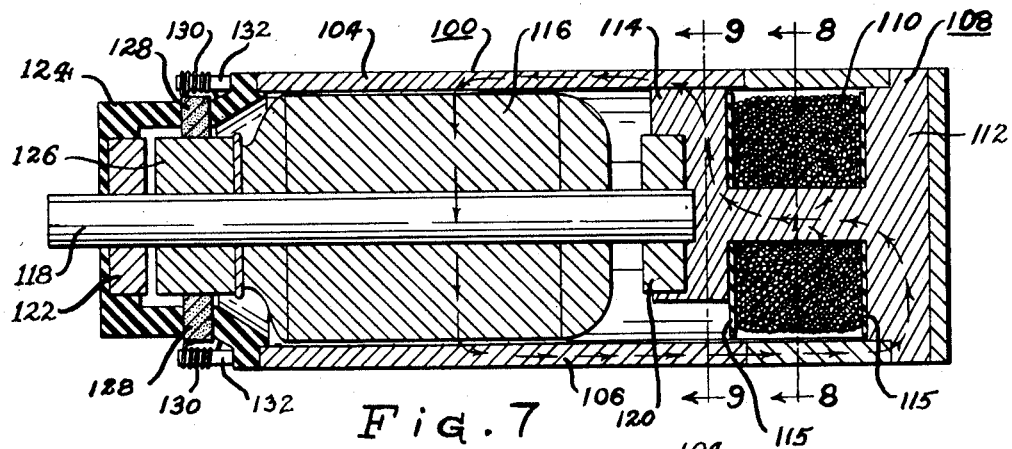
Figure 7 is a sectional view showing a modified form of motor construction suitable for use in direct current motors.
Figure 8:
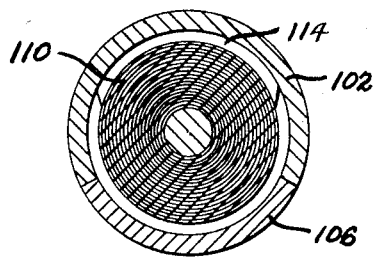
Figure 8 is a sectional view taken on line 8—8 of Figure 7.
Figure 9:
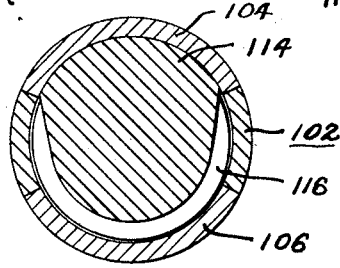
Figure 9 is a sectional view taken on line 9—9 of Figure 7.
Figure 11:
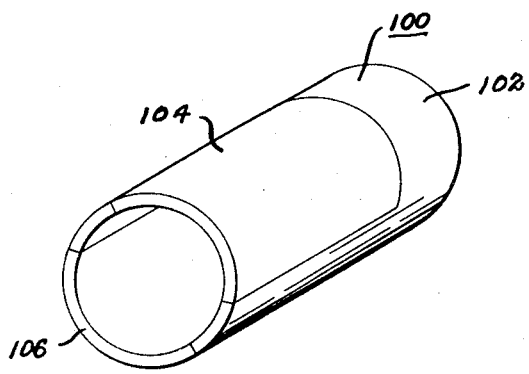
Figure 11 is a pictorial view showing the outer casing.
Figure 12:
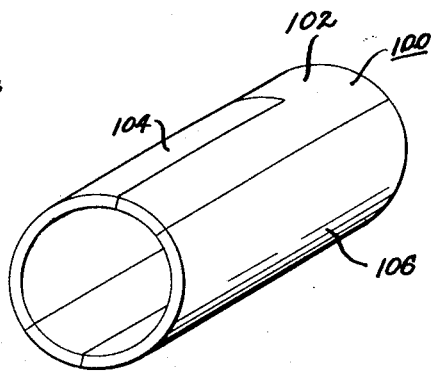
Figure 12 is a view similar to that shown in Figure 11 but with the casing rotated.
Figure 10:
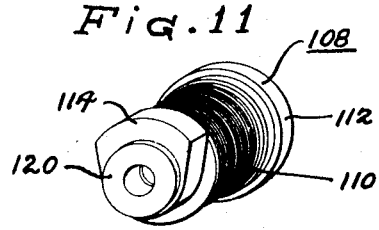
Figure 10 is an elevational view of the main stator core.

Referring now to Figures 7 through 12 of the drawing wherein we have shown a modified construction embodying features of our invention, reference numeral 100 designates generally an outer housing or casing which comprises nonmagnetic material 102 which serves to support a pair of magnetic pole pieces 104 and 106. The segments 104 and 106 constitute the pole pieces and are arranged in direct contact with the flanges 114 and 112 respectively of the soft iron field core 108 which is formed somewhat in the shape of a spool for supporting the field windings 110 as best indicated in Figure 10. Insulating discs 115 are arranged on the core 108 as shown in Figure 7. The pole piece 106 extends the full length of the outer casing 100 so as to have its one end in direct contact with the end flange 112 of the field piece 108 and the pole piece 104 is somewhat shorter and extends only far enough to contact the fragmentary flange 114 of the field piece 108. Figure 7 of the drawing shows the path of the flux by means of the arrows. A conventional armature 116 is rotatably supported within the casing 100 by means of the shaft 118 which is journaled in the bearing inserts 120 and 122. The bearing insert 120 is carried by the flange 114 of the core 108 as shown and the bearing insert 122 is carried by means of the end bell 124 which is carried by the main casing 100. The armature 116 includes the usual commutator 126 which cooperates with brushes 128 carried by the end bell 124. Brush engaging springs 130 are supported on the posts 132 which in turn are supported by the end bell 124.

While the form of embodiment of the invention as herein disclosed, constitutes a preferred form, it is to be understood that other forms might be adopted, all coming within the scope of the claims which follow.

Having thus described our invention, we claim:

1. In an electric motor, a cylindrical casing comprising a nonmagnetic cylindrical portion having segments of circumferentially spaced magnetic material embedded in said nonmagnetic material, an armature, means for rotatably supporting said armature within said casing, field coil means arranged in axial alignment with said armature, magnetic means for supporting said field coil means and comprising radially extending pole pieces arranged in radial alignment with said segments of circumferentially spaced magnetic material whereby said circumferentially spaced segments of magnetic material constitute field poles surrounding said armature.

2. In a hand tool, a nonmagnetic casing having circumferentially spaced longitudinally extending laminated field pole inserts, an armature, means for rotatably supporting said armature within said casing, end pieces for closing the ends of said casing, an armature shaft having one end projecting through one of said end pieces, and tool supporting means carried by said projecting end of said shaft, field coil means arranged in axial alignment with said armature within said casing, said field coil means including radially extending pole pieces in contact with said laminated inserts, said end pieces having aperture means therein, and means including a fan carried by said armature shaft for inducing the flow of air in through the aperture means of one of said end pieces and out through the aperture means of the other of said end pieces.

3. In a hand tool, a nonmagnetic casing having circumferentially spaced longitudinally extending laminated field pole inserts, an armature, means for rotatably supporting said armature within said casing, end pieces for closing the ends of said casing, an armature shaft having one end projecting through one of said end pieces, and tool supporting means carried by said projecting end of said shaft, field coil means arranged in axial alignment with said armature within said casing, said field coil means including radially extending pole pieces in contact with said laminated inserts, said end pieces having aperture means therein, and means including a fan carried by said armature shaft for inducing the flow of air in through the aperture means of one of said end pieces and out through the aperture means of the other of said end pieces, said fan being so constructed and arranged as to pull air in from the end farthest away from said tool supporting means and discharge the air at the end closest to said tool supporting means.

4. In a motor, a casing having portions of non-magnetic material and at least two spaced portions of magnetic material, first apertured means for substantially closing the one end of said casing, second apertured means for substantially closing the other end of said casing, said second apertured means including a bearing element, a second bearing element disposed intermediate the ends of casing and separating said casing into a field coil compartment and an armature compartment, shaft means journaled in said bearing elements, an armature carried by said shaft within said armature compartment, a motor cooling fan blade secured to said armature shaft and disposed within said armature compartment, field coil means disposed within said field coil compartment, said field coil means including two oppositely extending sets of laminated field pole elements and also including separate field coils for each of said sets of pole elements, said field coils for the one set being connected in series with the field coils for the other set with the field coils for the one set wound in the opposite direction to the field coils for the other set.

5. In a direct current electric motor, a cylindrical casing comprising a non-magnetic cylindrical portion having a pair of opposed longitudinally extending segments of circumferentially spaced magnetic material embedded in said non-magnetic material, an armature disposed within said casing adjacent the one end thereof, field coil means disposed within said casing adjacent the other end thereof, ferro-magnetic material for supporting said field coil means, said ferro-magnetic material comprising a spool member having flanged ends, one of said flanged ends having a portion arranged in contact with one of said magnetic segments and the other said flanged ends having a portion arranged in contact with the other of said magnetic segments.

6. In a direct current electric motor, a cylindrical casing comprising a non-magnetic cylindrical portion having a pair of opposed longitudinally extending segments of circumferentially spaced magnetic material embedded in said non-magnetic material, an armature disposed within said casing adjacent the one end thereof, field coil means disposed within said casing adjacent the other end thereof, ferro-magnetic material for supporting said field coil means, said ferro-magnetic material comprising a spool member having flanged ends, one of said flanged ends having a portion arranged in contact with one of said magnetic segments and the other said flanged ends having a portion arranged in contact with the other of said magnetic segments, and means for supporting said armature for rotation about an axis substantially coinciding with the axis of said cylindrical casing.

7. In a direct current electric motor, a cylindrical casing comprising a non-magnetic cylindrical portion having a pair of opposed longitudinally extending segments of circumferentially spaced magnetic material embedded in said non-magnetic material, armature means including a shaft supported within said casing adjacent the one end thereof, field coil means disposed within said casing adjacent the other end thereof, ferro-magnetic material for supporting said field coil means, said ferro-magnetic material comprising a spool member having flanged ends, one of said flanged ends comprising a continuous flange closing one end of said cylindrical casing and having a portion arranged in contact with one of said magnetic segments, and the other of said flanged ends extending throughout only a portion of the circumference thereof and being arranged in contact with the other of said magnetic segments.

8. In a direct current electric motor, a cylindrical casing comprising a non-magnetic cylindrical portion having a pair of opposed longitudinally extending segments of circumferentially spaced magnetic material embedded in said non-magnetic material, armature means including a shaft supported within said casing adjacent the one end thereof, field coil means disposed within said casing adjacent the other end thereof, ferro-magnetic material for supporting said field coil means, said ferro-magnetic material comprising a spool member having flanged ends, one of said flanged ends comprising a continuous flange closing one end of said cylindrical casing and having a portion arranged in contact with one of said magnetic segments, and the other of said flanged ends extending throughout only a portion of the circumference thereof and being arranged in contact with the other of said magnetic segments, said last named flanged end including a bearing insert for supporting one end of said shaft.

9. In an electric motor, a casing comprising a first segment of magnetic material extending substantially the full axial length of said casing, and a second segment of magnetic material circumferentially spaced from said first segment by means of non-magnetic material and extending less than the full axial length of said casing, an armature disposed within one end of said casing, field excitation means disposed within the other end of said casing and having a first pole piece arranged in engagement with said first named segment and a second and opposite pole piece arranged in engagement with said second segment.

10. In an electric motor, a cylindrical casing comprising a non-magnetic cylindrical portion having segments of circumferentially spaced magnetic material embedded in said non-magnetic material, an armature, means for rotatably supporting said armature within said casing, field coil means arranged in axial alignment with said armature, magnetic means for supporting said field coil means and comprising pole pieces having a separate pole piece arranged in engagement with each of said segments of circumferentially spaced magnetic material whereby said circumferentially spaced segments of magnetic material constitute field poles having portions surrounding said armature.

11. In an electric motor, a casing comprising non-magnetic material having segments of circumferentially spaced magnetic material embedded in said non-magnetic material, an armature, means for rotatably supporting said armature within said casing, field pole means disposed within said casing in axial alignment with said armature, said field pole means comprising a laminated core having circumferentially spaced coil slots formed therein, and field coils disposed within said slots, said field coils being spaced from said casing whereby air passages are provided between said field coils and said casing, and fan means for circulating air through said air passages.

12. In an electric motor, a casing comprising non-magnetic material having segments of circumferentially spaced magnetic material embedded in said non-magnetic material, an armature, means for rotatably supporting said armature within said casing, field pole means disposed within said casing in axial alignment with said armature, said field pole means comprising a laminated core having circumferentially spaced coil slots formed therein, and field coils disposed within said slots, said segments of laminated magnetic material having a greater thickness than said non-magnetic material whereby said non-magnetic material is spaced from the field coils disposed within said slots, and means for inducing air to flow through the spaces thus formed between said field coils and said non-magnetic material.

13. In an electric motor, a casing comprising nonmagnetic material having segments of circumferentially spaced magnetic material embedded in said nonmagnetic material, a rotor including armature windings and a commutator assembly, means for rotatably supporting said armature within said casing, field coil means arranged in axial alignment with said armature, magnetic means for supporting said field coil means and comprising radially extending pole pieces arranged in radial alignment with said segments of said circumferentially spaced magnetic material whereby said circumferentially spaced segments of magnetic material constitute field poles surrounding said armature, brush means arranged in contact with said commutator, and means for supporting said brush means on said casing.

14. In an electric motor, a casing comprising a nonmagnetic portion having segments of circumferentially spaced magnetic material seated in said nonmagnetic material, closure means for the ends of said casing, first bearing means carried by said closure means, second bearing means disposed intermediate the ends of said casing, a rotor including a shaft journalled in said bearing means, field coil means arranged in axial alignment with said rotor, magnetic means for supporting said field coil means and comprising radially extending pole pieces arranged in radial alignment with said segments of said circumferentially spaced magnetic material whereby said circumferentially spaced segments of magnetic material constitute field poles surrounding said armature, said second named bearing means being disposed between said rotor and said field coil means.

KEITH CONRAD.
JAMES W. HACKETT.

REFERENCES CITED

The following references are of record in the file of this patent:

UNITED STATES PATENTS

| Number | Name | Date |
|---|---|---|
| 217,807 | Ludwig | July 22, 1879 |
| 1,616,465 | Ostler | Feb. 8, 1927 |
| 1,722,284 | Fisher | July 30, 1929 |
| 1,966,897 | Lofgren | July 17, 1934 |
| 2,192,304 | Gilliver | Mar. 5, 1940 |
| 2,346,778 | Mitchel | Apr. 18, 1944 |